P. A. FISCHER.
THUMB TACK.
APPLICATION FILED OCT. 22, 1914.
1,142,688.
Patented June 8, 1915.
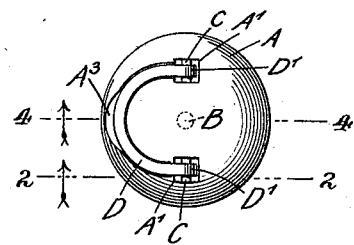
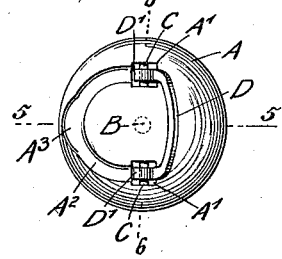
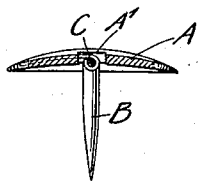
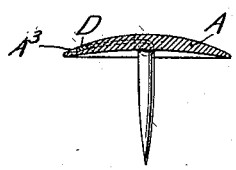
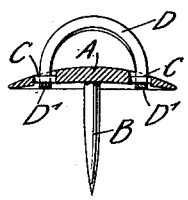
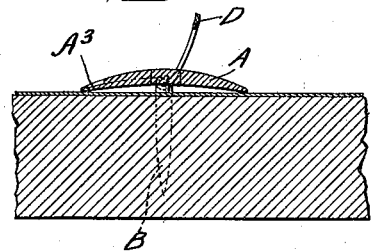
WITNESSES
INVENTOR
Philip A. Fischer
BY
ATTORNEYS

UNITED STATES PATENT OFFICE.

PHILIP A. FISCHER, OF NEW YORK, N. Y.

THUMB-TACK.

1,142,688.

Specification of Letters Patent.  Patented June 8, 1915.

Application filed October 22, 1914. Serial No. 868,037.

*To all whom it may concern:*

Be it known that I, PHILIP A. FISCHER, a citizen of the United States, and a resident of the city of New York, borough of Manhattan, in the county and State of New York, have invented a new and Improved Thumb-Tack, of which the following is a full, clear, and exact description.

The object of the invention is to provide a new and improved thumb tack for use by draftsmen and other persons and arranged to permit the user to readily push the tack in place, and to allow of conveniently and quickly removing it without resorting to a prying operation and without danger of marring the drawing or other article held in place by the tack.

In order to accomplish the desired result, use is made of a handle of approximately U shape, and pivots integral on the head of the thumb tack and arranged diametrically on opposite sides of the center of the head a distance within the margin of the head, the end of the said handle engaging the said pivots to allow of swinging the handle into an upright position or into a folded position on the top of the head and within the margin thereof.

A practical embodiment of the invention is represented in the accompanying drawings forming a part of this specification, in which similar characters of reference indicate corresponding parts in all the views.

Figure 1 is a plan view of the thumb tack with the handle in folded position; Fig. 2 is a sectional side elevation of the same on the line 2—2 of Fig. 1; Fig. 3 is a plan view of the thumb tack with the handle in raised position; Fig. 4 is a sectional side elevation of the thumb tack on the line 4—4 of Fig. 1; Fig. 5 is a similar view of the same on the line 5—5 of Fig. 3; and Fig. 6 is a cross section of the same on the line 6—6 of Fig. 3.

The head A of the thumb tack is preferably made circular and is concave on the under side and spherical on the top, and from the under side of the said head A depends centrally a point B adapted to pierce the drawing or article to be held down on the drawing board or other support into which is adapted to pass the point B with a view to hold the article in position on the support. The head A is provided on opposite sides of its center with recesses or apertures A' through which extend diametrical pivots C formed integral with the head A. The pivots C are engaged by eyes D' formed on the end of a handle D, preferably made U-shaped and adapted to be swung either into folded position, as shown in Figs. 1, 2 and 4, or into an upright, raised position, as illustrated in Figs. 3, 5 and 6. The handle D when in folded position fits into a recess $A^2$ formed in the top of the head A and conforming to the shape of the handle D, so that when the handle is in folded position the upper surface of the folded handle D is flush with the upper surface of the head A, and consequently the head A can be readily pressed with the thumb of the user so as to press the thumb tack in place for holding an article in position on the support. The middle portion of the recess $A^2$ is provided with an outer extension $A^3$ to permit the user to conveniently pass a finger nail under the middle of the handle D with a view to swing the latter out of its folded position into an upright position. When the handle D is in upright position, the operator can readily take hold of it with the thumb and forefinger and then the operator can turn the thumb tack so as to readily loosen the point B in the support to allow of pulling the thumb tack out of engagement with the support and the article held thereon. The rear walls of the apertures A' are arranged close to the eyes D' so that the handle D when swung upwardly into an upright position cannot swing further in an opposite direction and hence the user can readily take hold of the handle whenever it is desired to remove the tack from the support and the article. The rear walls of the apertures A' are so located that when the handle D is swung into an upright position it leans slightly to the side of the head opposite the one having the recess $A^2$ and hence the handle is not liable to drop accidentally back into folded position, thus enabling the user to readily take hold of the handle after the same has been swung upward into active position.

It will be noticed that by the arrangement described the handle D when in folded position lies completely within a distance from the peripheral edge of the head A, and it forms no undesirable projection on the upper surface of the head. When the handle D is in upright position it projects a sufficient distance above the top of the head to allow the user to obtain a firm grip on the handle for turning the thumb tack and lifting it out of engagement with the support and the article held thereon.

By reference to the drawings, it will be noticed that the bottom portions of the eyes D' are above the plane of the edge of the head A owing to the concavity of the under side of the head A and hence do not come into contact with the paper or other article held on the support by the thumb tack. By the arrangement described the handle D can be freely lifted into upright position without danger of the eyes D' coming into contact with the paper and marring the same.

The thumb tack shown and described is very simple and durable in construction, and is composed of comparatively few parts, not liable to get out of order.

Having thus described my invention, I claim as new and desire to secure by Letters Patent:

1. A thumb tack, comprising a head, a point depending centrally from the under side of the said head, a handle of approximately U shape, and pivots integral on the said head and arranged diametrically on opposite sides of the center of the head and a distance within the margin of the head, the ends of the said handle engaging the said pivots to allow of swinging the handle into upright position or into a folded position on the top of the head and within the margin thereof.

2. A thumb tack, comprising a head having an approximately semicircular recess in the upper face, the ends of the recess leading into apertures formed in the head at diametrically opposite points, pivots integral with the said head and extending diametrically across the said apertures, and an approximately U-shaped handle provided at its ends with eyes engaging the said pivots, the said handle being adapted to fold into the said recess.

3. A thumb tack, comprising a head having an approximately semicircular recess in the upper face, the ends of the recess leading into apertures formed in the head at diametrically opposite points, the middle of the said recess having an outward extension, pivots integral with the said head and extending diametrically across the said apertures, and an approximately U-shaped handle provided at its ends with eyes engaging the said pivots, the said handle being adapted to fold into the said recess.

In testimony whereof I have signed my name to this specification in the presence of two subscribing witnesses.

PHILIP A. FISCHER.

Witnesses:
  THEO. G. HOSTER,
  PHILIP D. ROLLHAUS.

Copies of this patent may be obtained for five cents each, by addressing the "Commissioner of Patents, Washington, D. C."